United States Patent

Shelby

[11] 3,752,621
[45] Aug. 14, 1973

[54] REMOVEABLE BLOW NEEDLE MECHANISM

[75] Inventor: Richard K. Shelby, Hinsdale, Ill.

[73] Assignee: Monsanto Company, St. Louis, Mo.

[22] Filed: May 6, 1971

[21] Appl. No.: 140,665

[52] U.S. Cl...... 425/192, 425/DIG. 204, 425/387 B
[51] Int. Cl............................................ B29d 23/03
[58] Field of Search............... 425/190, 192, 326 B, 425/387 B

[56] References Cited
UNITED STATES PATENTS

| | | | |
|---|---|---|---|
| 3,198,861 | 8/1965 | Marvel | 425/326 B X |
| 3,513,502 | 5/1970 | Chambers | 425/192 |
| 3,339,229 | 9/1967 | Billings | 425/387 B X |
| 2,810,160 | 10/1957 | Bottleman | 425/387 B X |

OTHER PUBLICATIONS

Lawrence, Def. Pub. of Serial No. 111,383 filed Feb. 1, 1971, published in 890 O.G. 982, on Sept. 21, 1971.

Primary Examiner—J. Spencer Overholser
Assistant Examiner—David S. Safran
Attorney—James C. Logomasini, Michael J. Murphy and Neal E. Willis

[57] ABSTRACT

Means are provided which permit rapidly extracting the needle assembly of a partible blow mold toward the mold axis through the bore of the mold section in which it is operable. These means include a stop member positioned in the bore for delimiting the advancing stroke of the needle assembly, such member being detachably fastened through the face of the mold section. Improved means for automatically admitting pressurized fluid to the hollow interior of the blow needle after penetration of the parison by the needle may also be provided.

8 Claims, 3 Drawing Figures

Patented Aug. 14, 1973

INVENTOR
RICHARD K. SHELBY
BY Michael J. Murphy
ATTORNEY

Patented Aug. 14, 1973

INVENTOR
RICHARD K. SHELBY
BY Michael J. Murphy
ATTORNEY

REMOVEABLE BLOW NEEDLE MECHANISM

BACKGROUND OF THE INVENTION

This invention relates to blow molding and more particularly to blow molding systems utilizing a hollow needle to expand the parison within the blow mold.

Conventional molding machines include a plurality of split molds which rotate about a common axis in either the horizontal, vertical or some intermediate plane. Each split mold generally includes a pair of mold sections which when closed define a cavity, the surface of which is contoured to the general configuration of an article to be molded therein. One of the mold halves may be provided with a bore in which a hollow blow needle is reciprocatably mounted for puncturing and then pneumatically expanding a clamped-off portion of an extruded parison. After many cycles of such machines, it frequently becomes necessary to replace a blow needle because of its being blunted or broken. In the past, to accomplish this, the mold section carrying the blow needle had to be removed from its mounting on the machine in order to provide access to the means used to hold both the blow needle and the piston on which it was generally mounted in place. After replacing the blow needle, it was then necessary to remount either the original or a new assembly in the mold section and then to secure the mold half on its support again. Needless to say, to replace blow needles in this manner was obviously time consuming and resulted in a substantial amount of costly machine down time.

In U. S. Pat. No. 3,513,502, this problem has been alleviated somewhat by the quick-change, cam operable type of coupling mechanism disclosed therein which eliminates the requirement of removing and reinstalling the mold half carrying the needle assembly for each needle change. However, the detachable coupling therein disclosed is operable only from the rear side of the mold section, or in other words the side closest to the machine axis when the needle assembly is in a fixed inner mold section which is complementary to an outer mold section movable toward and away from the inner section radial to the axis of the machine, as generally described in copending application Ser. No. 102,783, filed Dec. 30, 1970, now U.S. Pat. No. 3,718,416, and assigned to the assignee of the present invention. In these so called "wheel" forms of continuously operating blow molding machine systems, it is highly desirable to minimize the space between adjacent mold units and thereby the amount of the continuously extruding parison which lies between such units, since this material represents waste scrap which requires reprocessing. To use the coupling of the aforementioned patent in this type of system requires that the molds be moved out on the radius of the machine an amount sufficient to provide adequate clearance at the rear of each inner mold section to be able to operate the coupling and remove the needle assembly through the rear face of the mold section. However, as mentioned, such a mold layout increases the level of scrap generated and to this extent the quick change coupling of the prior art seems to be deficient.

In addition, it is known in these types of needle blow systems that it is desirable to pierce the wall of the clamped off parison portion in the blow mold with the needle prior to introduction of the air for expanding the parison, otherwise the air if introduced first will collapse the parison wall portion opposite the point of the needle, thereby rendering it impossible for the needle to penetrate it in the manner intended. Mechanisms for accomplishing this in the past, however, have been somewhat complicated.

SUMMARY OF THE INVENTION

Accordingly, it is a principal object of this invention to avoid these prior art disadvantages by providing novel, extremely simple, quickly functionable blow needle mounting means which permits replacing a blow needle assembly without removing the mold section in which it is mounted from the machine, and which does not require substantial clearance at the rear of the mold section to accomplish this.

An additional object of this invention is to provide a simplified blow needle assembly which facilitates removal and replacement of the blow needle portion thereof.

Another object of this invention is to provide a simplified structure for automatically admitting air to the hollow interior of a blow needle after penetration of the parison by the needle.

A further object of this invention is to provide novel needle assembly mounting means which permits extraction of the blow needle assembly through the molding face of the partible section in which it is installed.

Other objects of this invention will in part be obvious and will in part appear hereinafter.

These and other objects are accomplished in a molding machine of the type including a split mold carrying a needle assembly for puncturing and expanding a clamped off portion of a tubular parison, by providing the improvement which comprises means for quickly extracting the needle assembly toward the mold axis through the bore of the mold section in which it is operable. These means include a stop member in a bore which opens into the face of the mold section in the flash holding portion thereof, such stop member serving to delimit the advancing stroke of the needle assembly and being extractable through the opening of the bore, and means for detachably fastening the stop member to the mold section.

Means may be provided for temporarily obstructing introduction of the pressurized fluid to the interior of the hollow needle until the piston on which the needle is mounted moves a preselected distance in the bore, such distance being sufficient to permit needle penetration of the parison enclosed within the mold.

BRIEF DESCRIPTION OF THE DRAWINGS

In describing the overall invention, reference will be made to the accompanying drawings wherein.

DETAILED DESCRIPTION OF THE ILLUSTRATED EMBODIMENTS

Figure 1:
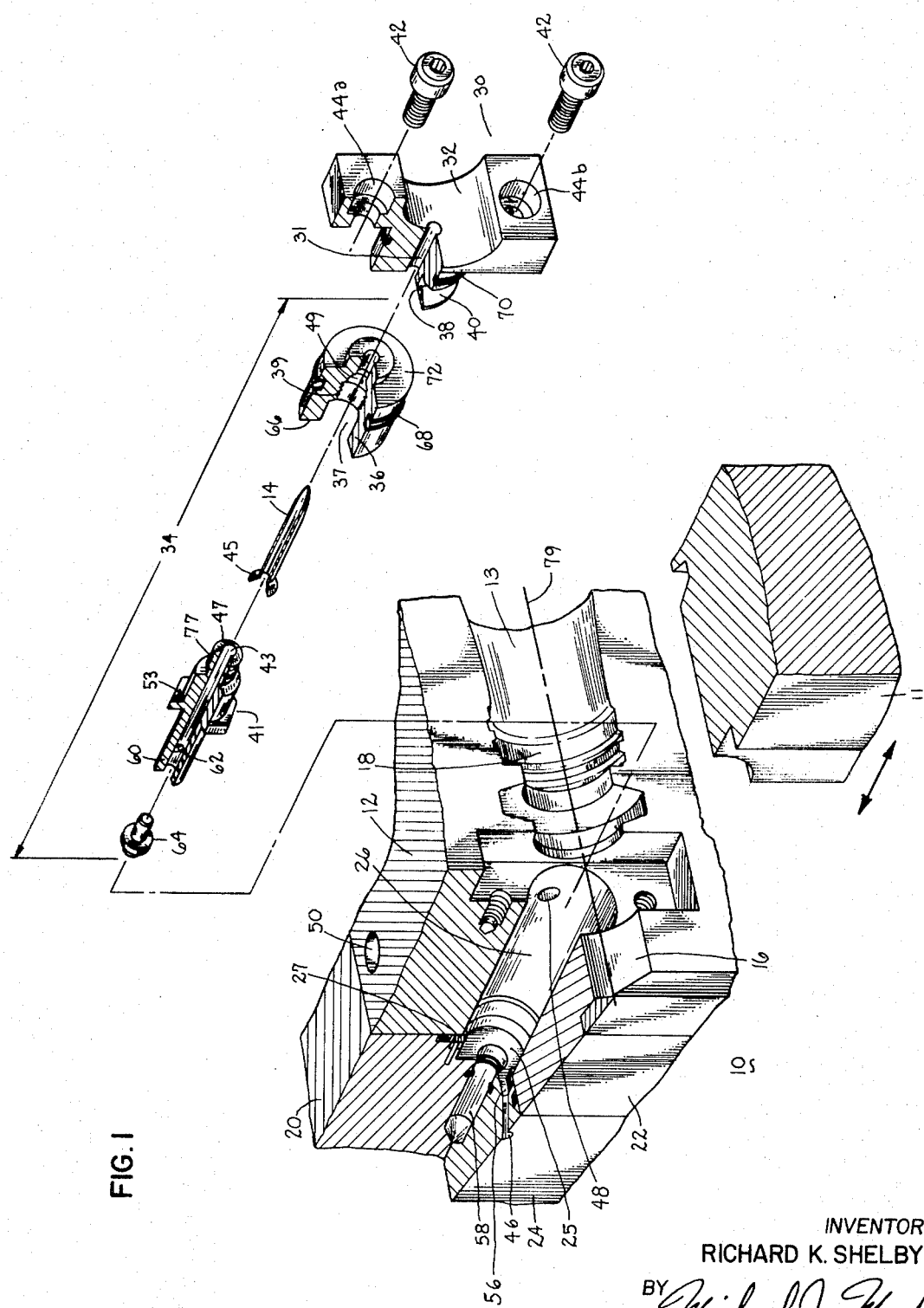
FIG. 1 is a perspective, partial, exploded view with parts separated of the improved apparatus of the present invention.
Figure 2:
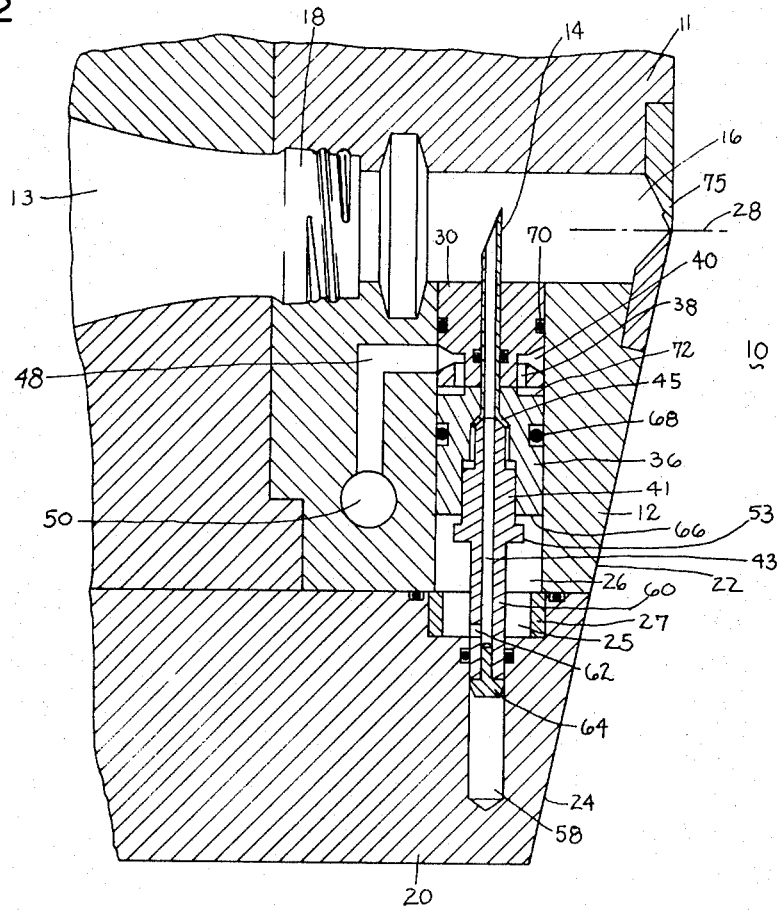
FIG. 2 is a partial, vertical sectional view of the parts of FIG. 1 in assembled condition.

Referring now to the drawings, there in illustrated in FIGS. 1 and 2 a split mold 10 formed by a pair of mold sections 11 and 12 which together define a cavity 13 for expanding a tubular parison enclosed therein into the shape of an article. Mold sections 11 and 12 are suitably mounted upon a conventional blow molding machine (not shown) which accommodates a parison extruded between the mold sections when the latter are in open or separated condition as illustrated in FIG. 1. Mold sections 11 and 12 are closed in a conventional manner to punch or clamp off a portion of the extruded tubular parison between opposing pinch lands typically illustrated at 75 in FIG. 2 for one end of mold 10. The parison is eventually punctured by blow needle 14 and inflated in a known manner to the configuration of cavity 13.

Inner mold section 12 of mold 10 has a flash holding portion 16 adjacent one end of cavity 13, which in the illustrated embodiment is adjacent the portion of the cavity defining neck 18 of the blown article. Inner mold section 12 is mounted by suitable conventional means, not shown, on a support plate 20, faces 22 and 24 of mold section 12 and support plate 20 being in almost abutting relationship with opposing faces of the next adjacent mold of the multiple mold machine.

According to the present invention, means are provided to facilitate rapid extraction of the assembly 34 which includes needle 14, toward axis 28 of mold 10 through a bore 26 in mold section 12. These means include bore 26 formed in and extending entirely through section 12 substantially perpendicular to axis 28 of mold 10 in flash holding portion 16 thereof. Portion 16 is opposite an identical section in outer mold section 11, and is semi-circular in cross section. Stop member 30 is mounted in bore 26, and has a semi-circular front end portion 32 which lies flush with the surface of flash holding section 16 when fitted therein in the manner illustrated in FIG. 2. Stop member 30 further includes a central channel 31 through which needle 14 of needle assembly 34 extends, needle 14 being mounted in piston 36 of assembly 34. In the embodiment of FIGS. 1 and 2, piston 36 has a cylindrical cavity 37 formed therein with a portion 39 of its surface being threaded, and by means of which rod 41 is secured therein via matching threads 77 on its surface. The rearward end portion of needle 14 is flared outwardly at 45 and is releasably clamped in place between surface 47 of rod 41 and surface 49 of the cylindrical cavity of pistons 36 with the hollow interior of needle 14 aligned opposite axially extending bore 43 in rod 41. Hex nut 53 may be provided as an integral part of rod 41 to facilitate threadable engagement and disengagement of rod 41 in piston 36.

Stop member 30 is also provided with a plurality of axially extending channels 38 formed therein which open at one end into the portion of bore 26 in which piston 36 is operable and at the other end into a peripherally extending annular depression 40 in the surface of stop members 30.

Means are provided for releasably fastening stop member 30 to mold section 12 which, in the illustrated embodiment, comprise fastening means such as a pair of threaded set screws 42 extending through bores in stop member 30 on either side of the longitudinal axis 79 of mold section 12. Such set screws are installed through wing portions 44a and 44b of stop member 30.

Pressurized fluid means are provided for moving piston 36 in bore 26 and for supplying pressurized fluid such as compressed air to the interior of hollow needle 14. These means include a channel 46 opening on the lower side of piston 36 into bore 26, bore 48 communicating with channel 50, as well as opening into annular depression 40 in stop member 30.

Means may be provided for temporarily obstructing introduction of the pressurized fluid to the interior of needle 14 until piston 36 moves a preselected distance in bore 26, or in other words, until the parison puncturing leading end of needle 14 mounted on piston 36 has penetrated the wall of the enclosed parison. In the embodiment of FIGS. 1 and 2, these means include pressurized fluid entry port 56 at the intersection of channel 46 and bore 26. Second bore portion 58 in support plate 20 extends rearwardly of bore 26 and entry port 50. Passage or bore 43 extends through rod member 41 including end portion 60 in substantial alignment at its forward end with the hollow interior of needle 14. The other end 62 of passage 43 is located such that it opens into second bore portion 58 when piston 36 is in its rearmost portion and into bore 26 when piston 36 is in its most forward position. A plug 64 may be used to seal the end of passage 43 rearward of end 62.

Figure 3:
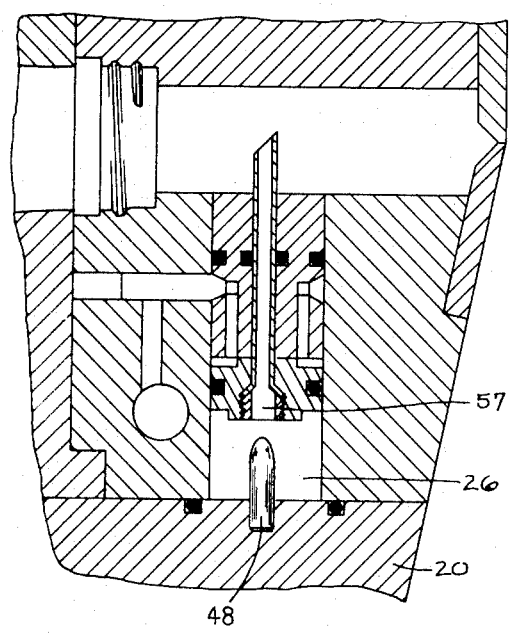
FIG. 3 is a fragmentary view similar to FIG. 2 of an alternative form of the present invention.

In the alternative embodiment of FIG. 3, these temporary obstructing means include a fixed pin 48 mounted on support plate 20 extending a preselected distance into bore 26 in alignment with and sized to sealably and snugly fit within an end portion 51 of hollow needle 14 during the initial portion of the forward movement of pitson 36 in bore 26.

Seals such as resilient O-rings typically illustrated at 68 and 70 in FIG. 2 may be inserted as shown between the various parts of the mechanism during assembly to insure against unwanted leakage or passage of the pressurized air between opposing faces of the various parts. Also, suitable cooling means such as cooling channels, not shown, should be formed in each mold section to chill the molding surfaces so that the thermoplastic of the parison will set after outward expansion against such surfaces. An extension 25 of bore 26 may be formed in support plate 20 for the purpose of mounting a replaceable annular wear ring 27 therein which serves as an abutment to limit rearward movement of piston 36.

In operation, after mold sections 11 and 12 are closed by conventional means on a portion of an extruding parison, pressurized fluid such as air is admitted through channel 46 into bore 26 from a suitable conventional source of supply and by means of suitable conventional valving, neither being shown. Piston 36 which at this point is seated in the lower end of bore 26 against wear ring 27 then begins to rise, such that surface 66 thereof moves away from wear ring 27. At this point, however, air cannot enter port 62 which communicates via passage 43 with the hollow interior of needle 14, since port 62 is still sealably confined within second bore portion 58. Forward movement of piston 36 will eventually be interrupted through contact with the rear face 69 of stationary stop member 30. When piston 36 reaches this position, as illustrated in FIG. 2, the leading end of needle 14 has advanced sufficiently to penetrate the parison wall and end 62 of passage 43 has emerged from confinement within bore portion 58 such that it is in communication with entry port 56, whereupon continued introduction of air will result in its flow through needle 14 and then into the hollow interior of the enclosed parison thus causing its outward expansion against the walls of mold cavity 13 to form the article.

After the hollow parison is thus expanded within the mold, conventional valving exterior to the machine (not shown) and communicating with channel 46 is caused to be reoriented so as to vent channel 46 to atmosphere, whereupon the air within the expanded parison will flow out of cavity 13 through needle 14 and channel 46. After the pressure within the mold has been reduced to atmosphereic, pressurized fluid is introduced through channel 50, annular depression 40 and passages 38 in stop member 30 and against frontal surface 72 of piston 36 so as to cause piston 36 and end portion 60 of rod member 41 to move rearwardly such that part 62 of passage 43 is confined within second bore portion 58. The lower end of second bore portion 58 may have to be vented to atmosphere to avoid a buildup of pressure therein as end portion 60 moves further into portion 58. Such downward or rearward movement causes retraction of needle 14 through the previously formed hole in the parison wall.

In the alternative embodiment of FIG. 3, when piston 36 begins to rise in bore 26, the surface of end portion 51 of needle 14 initially slides along pin 48 in a sealable manner to the extent of preventing entry of the pressurized air to the forward portion of needle 14 as long as pin 48 is within end portion 51. This amount of initial movement is sufficient to cause penetration of the parison wall with the sharp front end of needle 14. Continued introduction of air to cavity or bore 26 after end portion 51 has moved away from pin 48, or in other words after the needle has pierced the parison wall, will result in passage of the air through the unobstructed end portion 51 and needle 14 into the hollow interior of the enclosed parison thus causing its outward expansion against the wall of cavity 13 to form the article. Accordingly, by providing that the diameter of pin 48 is such as to be telescopingly slideable within end portion 51 of needle 14, the needle is caused to automatically penetrate the parison wall without introducing any air through the needle, whereupon such air is then admitted only after the portion 51 rides off of pin 48.

When a needle 14 has become blunted or bent, or is otherwise in need of replacement, mold sections 11 and 12 are separated and the two set screws 42 merely backed off to permit extracting stop member 30 from its position within bore 26. Thereupon, a short blast of air may be introduced to bore 26 through channel 46 to pop needle assembly 34 out of bore 26. Should mold section 12 be in the inverted position, e.g., at 12 o'clock in a blow molding machine of the type illustrated in U.S. Pat. No. 2,784,452, such a blast of pressurized air may not be necessary and the needle assembly may fall out of bore 26 under the influence of gravity. Hex head nut 53 of rod member 41 is then backed off to release needle 14 from its clamped poistion in piston 36. After inserting a new needle in the piston, the procedure is reversed and stop member 30 reinserted in bore 26 by dropping wing portions 44a and 44b into conforming slots in mold section 12. As can be appreciated, it is not necessary to interfere in any way with the pressurized fluid supply lines feeding the mold 10 or its support plate 20 during such a needle change. On reinserting set screws 42 in their appropriate places, production on the machine may again be initiated. Obviously, a separate assembly 34 which has already been fitted together may be installed in mold section 12 after removal of stop member 30, if it is desired to keep the equipment downtime at an absolute minimum. In such a case, the needle being replaced can be disassembled from the piston at a relatively leisurely pace after the machine has been restarted. Replacement of the needle of the assembly illustrated in FIG. 3 is carried out in generally the same manner as that of FIG. 2, except that each needle is provided with threads for engagement with piston 36 instead of utilizing a separate rod member for such attachment.

The above description and particularly the drawings are set forth for purposes of illustration only and are not to be taken in a limited sense.

Though the means for rapidly extracting the needle assembly through the face of the mold in a direction generally perpendicular to the parting line has been described with respect to a molding machine wherein the mold sections move perpendicular to the axis of the machine, it should be understood that such novel means may be utilized when the mold sections are operable parallel to the machine axis, whether it lie in the horizontal, vertical or any intermediate plane.

Various modifications and alterations of the invention herein described will be readily suggested to persons skilled in the art. It is intended, therefore, that the foregoing be considered as exemplary only and that the scope of the invention be ascertained from the following claims.

What is claimed is:

1. In a split mold having an internal cavity and carrying an assembly which includes a blow needle and means for reciprocating said needle in a bore opening into said cavity formed in a section of said split mold for puncturing and expanding in said cavity a clamped off portion of a tubular parison, the improvement which comprises means removably mounted at said bore end opening into the cavity to delimit advancing movement of said assembly, said assembly being removeable through said bore end upon removal of said means.

2. The apparatus of claim 1 wherein said cavity includes a portion for containing waste flash, said bore opening into such flash containing cavity portion and said means comprising a stop member.

3. The apparatus of claim 2 wherein said blow needle is hollow, said means for reciprocating includes a piston carrying said needle and, said needle extending through said stop member.

4. The apparatus of claim 2 wherein said stop member has a plurality of flow channels formed therein opening at one end into the bore and at the other end into a peripherally extending annular depression in the surface of said stop member.

5. The apparatus of claim 2 including a pair of set screws extending through the stop member on either side of the longitudinal axis of the mold section in which it is mounted.

6. The apparatus of claim 3 wherein said piston has a cylindrical cavity formed therein, and including a rod releasably secured in the cavity of said piston, said rod having an axially extending bore, a rearward end portion of said needle having an outwardly flared section releasably clamped between a surface portion of said rod and a surface portion of said cylindrical cavity, the hollow interior of said needle being substantially aligned with the bore in said rod.

7. The apparatus of claim 4 including a pressurized air supply channel in the mold section opening into said annular depression.

8. In a molding machine of the type including a mold having sections with hollow portions which define an internal cavity when closed on each other and carrying a needle assembly which includes a blow needle and means for reciprocating said blow needle for puncturing and expanding in said cavity a clamped off portion of a tubular parison, the improvement which comprises:

a. a bore for said needle assembly extending through one of said sections substantially perpendicular to the longitudinal axis thereof and opening into a flash holding portion of the hollow portion of said one section, said flash holding portion being semi-circular in cross section;

b. a stop member mounted in said bore at the end opening into said flash holding portion, and stop member having a semicircular end portion flush with that of the surface of the flash holding portion and a central channel for the needle of said assembly; and c. means adjacent each side of the semi-circular end portion for releasably securing said stop member to said one mold section, said assembly being removable through said bore end opening into said flash holding portion upon removal of said stop member.

* * * * *